United States Patent [19]
Chmiel et al.

[11] Patent Number: 5,913,961
[45] Date of Patent: Jun. 22, 1999

[54] AUTOMATIC HOT-BEVERAGE MAKER FOR COFFEE, TEA, AND SIMILAR BEVERAGES

[75] Inventors: Zdzislaw Chmiel; Grzegorz Rybka, both of Rzeszow; Stanislaw Piejko, Glogow Mlp.; Wieslaw Dziedzic, Rzeszow; Zygmunt Marchlik, Rzeszow; Ryszard Kotowicz, Rzeszow; Malgorzata Bieniasz-Szpak, Rzeszow; Boguslaw Fraczek, Mrowla, all of Poland

[73] Assignee: Zelmer, Rzeszow, Poland

[21] Appl. No.: 09/024,466

[22] Filed: Feb. 17, 1998

[30] Foreign Application Priority Data

Feb. 16, 1997 [PL] Poland ................................. P-318518

[51] Int. Cl.⁶ .................................................. A47J 31/06
[52] U.S. Cl. ................................. 99/286; 99/307
[58] Field of Search .............................. 99/307, 306, 304, 99/298, 286

[56] References Cited

U.S. PATENT DOCUMENTS

4,969,393 11/1990 Mahlick et al. ...................... 99/286 X
5,038,675 8/1991 Hartel ........................................ 99/286

*Primary Examiner*—Reginald L. Alexander
*Attorney, Agent, or Firm*—Horst M. Kasper

[57] ABSTRACT

An automatic hot-beverage maker for brewing coffee, tea or similar brewed beverages is provided with a base stand. A cylindrical column having a bottom is attached to the base stand. A thin-walled casing shield is provided over a height of the cylindrical column for protection. A first clamping ring is mounted in a bottom area of the cylindrical column for support of a pitcher to receive brewed beverage. An arm is mounted to a top of the cylindrical column forming a second clamping ring for support of a charge container. A reservoir container placed in an upper part of the cylindrical column has at its bottom an adjoining pan for water. Mounted within the pan is an exchangeable filter has a casing jacket forming an upper elastic lip on an inner side surface of the pan and a cover of the casing jacket is furnished in an encircling seat. A driver dog extends perpendicular from a top of the encircling seat in an upward direction into the reservoir container. An intermediate chamber is formed between a bottom of the casing jacket of the filter and a bottom of the pan.

23 Claims, 8 Drawing Sheets

AUTOMATIC HOT-BEVERAGE MAKER FOR COFFEE, TEA, AND SIMILAR BEVERAGES

BACKGROUND OF THE INVENTION

1. Field of the Invention

The present invention relates to an automatic hot-beverage maker for brewing coffee, tea or similar beverages.

2. Brief Description of the Background of the Invention Including Prior Art

A coffee maker is known for the brewing of coffee, wherein a filter for filtering the water is placed in a reservoir container, is seated in the pan of a reservoir container for water, and is sealed in that pan with gaskets. This coffee maker is described in the European printed patent document EP 0377,192, but the difficulty of changing an exhausted filter is a disadvantage of this construction.

A coffee maker is further known from the printed patent document WO 95/03733, where the coffee maker contains a removable filtering device. This filtering device is composed of a lower part, representing a utensil seated in a seat formed at the bottom of the reservoir container for the water, and an upper part, seated in the channel of the reservoir container for the water, standing toward the outside of that container and adapted to closing the lower part. A removable filtering bag is placed in the lower part. The filtering bag contains the material which cleans the water. This device is very large and is labor-consuming during manufacture, and further, the removable filtering bag, once it is seated together with the whole device in the seat of the reservoir container, does not assure a corresponding tightness and imperviousness such that water, which was not prefiltered, could penetrate to the brewed beverage.

SUMMARY OF THE INVENTION

1. Purposes of the Invention

It is an object of the present invention to furnish an automatic beverage maker, wherein the possibility exists easily to provide a new design for the automatic beverage maker.

It is another object of the present invention to provide an automatic beverage maker, where, once the automatic beverage maker is used, the water filter can be simply produced and easily changed.

It is yet a further object of the present invention to provide an automatic beverage maker, where the range of application of the automatic beverage maker is extended to brewing herbal infusions and teas.

These and other objects and advantages of the present invention will become evident from the description which follows.

2. Brief Description of the Invention

The present invention provides for an automatic hot-beverage maker for brewing coffee, tea or similar brewed beverages. A cylindrical column having a bottom is attached to a bottom of a base stand. A thin-walled casing shield protects the cylindrical column at least over part of a height of the cylindrical column. A first clamping ring is mounted in an area of the bottom of the cylindrical column to the cylindrical column. A pitcher for a brewed beverage is placed on the base stand and seated in the first clamping ring. An arm is mounted to a top of the cylindrical column forming a second clamping ring. A charge container is mounted to the arm of the cylindrical column and seated in the second clamping ring. A reservoir container is placed in an upper part of the cylindrical column of an automatic hot-beverage maker. A pan adjoins at a bottom of the reservoir container for water. An exchangeable filter is placed in the pan and has a casing jacket forming an upper elastic lip on an inner side surface of said pan and a cover of the casing jacket is furnished in an encircling seat. A driver dog extends perpendicular from a top of the encircling seat in an upward direction into the reservoir container. An intermediate chamber is formed between a bottom of the casing jacket of the filter and a bottom of the pan.

An inspection window can be formed in the thin-walled casing shield of the cylindrical column and located at a level of the water surface in the reservoir container. The thin-walled casing shield can have a shape of a side of a cylinder and can be coiled with sheets of thin sheet metal. Edges of the sheets of the thin-walled casing shield can be inseparably connected.

The edges of the sheets of the thin-walled casing shield can be connected by a member selected from the group consisting of welding seam and overlap pleat.

The upper elastic lip of the casing jacket of the exchangeable filter can be formed at an upper edge of the casing jacket.

A side opening can be located at a top part of a wall of the casing jacket. A circumferential channel can be disposed in the top part of the wall of the casing jacket. A half-ring projection can be furnished on the cover and made on a side surface of said cover to be seated in the circumferential channel of the casing jacket. A latching projection can be furnished on the cover and made on the side surface of said cover opposite to the half-ring projection to lockingly engage the side opening.

The encircling seat of the driver dog can be formed as a riser head in a shape of an inverted upside-down bottom of a mug forming a middle recess.

A controller for regulating the strength of the brewed beverage can be disposed at the charge container. The controller contains a dish disk rotatably supported on a bottom of the charge container. The dish disk can have an outflow connector seat. A pin can be supported by a spring, resting on a storage tank for the charge container and seated slidably in an outflow opening furnished in the bottom of said storage tank.

The outflow opening can be conical. An angle at a tip of said cone can be larger than an angle of a tip of a conical neck of the pin. A contour of the outflow connector seat can have a shape resembling a screw line in a circumferential section.

Circumferential slots can be disposed in the outflow connector seat. A length of the circumferential slots can be limited by an outer contour of said outflow connector seat. A hand wheel can be furnished at the controller. The hand wheel can be rotatably supported around the bottom of the charge container. The hand wheel can be coupled to the dish disk.

An inner surface of the dish disk can be formed with at least one rib in a shape of a triangle protruding from the inner surface. The triangle can be seated in a connector seat of a cam follower of the hand wheel. The cam follower can be formed in a shape of a circumferential segment of a side of a cylinder. The triangle can have an expansion latch cooperating with a flange collar of the charge container.

An insert for the pitcher, wherein the insert can be seated on an inner surface of a wall of a pitcher cover of said pitcher under an inlet opening of the pitcher. The inner surface of the wall of the pitcher cover can have a sleeve mount as well as a hanger. The insert can have an expansion pin rotatably seated in the sleeve mount as well as an expansion holder, mounted on the hanger of the pitcher cover. The insert can have a first slot furnished in a bottom of the insert. A second slot can be formed at side walls of the insert. The second slot can be located in a vertical position in the lower part of this side wall. The first slot and the second slot of the insert can have a form of triangles according to a cross-section. The tips of the triangles can be directed to a middle of the insert.

The base stand of the automatic beverage maker has a body resembling the form of a segment of a sphere. A cylindrical column, having an upper part representing a reservoir container for water, is located beside the base stand in an annular clamping ring to which are connected contiguous parts of the base stand. The cylindrical column has an arm in the form of two rings contiguously connected to each other, wherein a charge container with shielded cover, formed like a sphere, is suspended from the cylindrical column. A pitcher seated in the base stand of the automatic beverage maker also has a shape similar to a sphere. The column is protected over at least part of its height by a thin-walled casing shield. A filter is seated in the pan of the reservoir container for water with an elastic lip of its casing jacket on the side of the pan at a lower level of the bottom of the reservoir container for water. An intermediate chamber is formed near the bottom of the reservoir container between the bottom of the pan and the bottom of the casing jacket of the filter. Furthermore, the cover of the casing jacket of the filter is provided with an encircling seat of the driver dog. The thin-walled casing shield has a form of a side surface of a cylinder and is made of a thin sheet of sheet metal, wherein the edges of the casing shield are inseparably connected by welding or by an overlap pleat.

The elastic lip of the casing jacket of the filter is formed at the upper edge of this casing jacket, which has a lateral opening located at the upper part of the wall of the casing jacket, and the longitudinal cover of the casing jacket has elastic hooks set in side openings of the casing jacket and a half-ring projection is formed in the side surface of that cover, set in the channel of the casing jacket.

The encircling seat of the driver dog is formed as a riser head in the form of the bottom of a mug upside down inverted from the middle recess.

The charge container includes a controller for the strength of the brew. The controller is located in a dish disk disposed at the bottom of the charge container and rotatably supported on the bottom of the charge container. The dish disk, disposed at the bottom of the charge container, has an outflow seat and a pin is located in the outflow opening and the pin is supported by a support spring of the charge container and is slidingly supported in the outflow opening furnished in the bottom of said charge container. The outflow opening is conical, and the top angle of said cone is larger than the angle of the tip of the conical neck of the pin. The contour of the outflow seat exhibits in a sectional view a circular shape resembling a screw line, but the outlet seat has a circumferential slot, wherein the length of the slot is limited by the inner contour of said seat. The controller has a rotatably supported hand wheel near the bottom of the charge container and the hand wheel is coupled to the pan dish with the aid of at least one rib in the shape of a triangle formed on the inner surface of the dish disk. The rib is seated in the seat of the hand wheel of the push rod, wherein the push rod is formed in the shape of a circumferential sector of the side surface of a cylinder and the push rod has an elastic catch for a snap seating of the hand wheel in the collar of the charge container near the bottom of said container.

The pitcher of the automatic beverage maker has an insert placed on the inner surface of the wall of the cover of the pitcher under its outflow opening. The inner surface of the wall of the cover has a sleeve holder or hook, at which the insert has an expansion pin rotatably seated in the sleeve holder of the cover as well as an elastic grip hanging on the hanger of the cover. The insert of the pitcher has a slot furnished in the floor of the insert and the side walls of the insert. The slot of the insert made in the side wall are disposed in the lower part of said wall. The slots of the insert have the shape of a triangle in a transverse cross-section, wherein the tips of the triangle are directed to the middle of said insert.

An advantage developed according to the present invention is the possibility of creating new kinds of automatic beverage makers by changing the height of the thin-walled reservoir container, which, for example, can cover the whole height of the column or to leave the reservoir container open. Changing the filter assures the high quality of the brew, and the straight construction guarantees an ease of exchanging the filter. Therefore, when the automatic hot-beverage maker with the exchangeable insert is employed for brewing beverages such as herbal beverages and teas, no unwanted residual odors and smells remain in the hot-beverage maker when coffee is brewed again.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

According to the present invention, there is provided for an automatic hot-beverage maker for brewing coffee, tea or similar brews. A charge container 5 is mounted to a cylindrical column 3 of an automatic hot-beverage maker. A pitcher 8 for receiving a brewed beverage is placed under this charge container 5 on a base stand 1 of the automatic hot-beverage maker. A reservoir container 9 with a pan 14 for an exchangeable filter 15 is placed in an upper part of the cylindrical column 3 of the automatic hot-beverage maker. The pitcher 8, resembling in shape to a segment of a ball, is placed on the base stand 1 of the automatic hot-beverage maker. The cylindrical column 3 has an arm 4, of a form of two rings coupled tangentially to each other, and is seated on one side of the base stand 1 in a clamping ring 2 being connected to the base stand 1 and tangentially contacting a part of the base stand 1. The charge container 5 of a form resembling a ball is mounted in the cylindrical column 3, while the pitcher 8 is placed on the base stand 1 of the automatic hot-beverage maker. The cylindrical column 3 is protected at least over part of its height with a thin-walled casing shield 10. The filter 15 is placed in the pan 14 of the reservoir container 9 for water and is mounted with an elastic lip 18 of the casing jacket 17 on an inner side surface 19 of said pan 14 below a bottom 13 of the reservoir container 9 for water. An intermediate chamber 37 is placed between a bottom conduit 38 of the pan 14 and a bottom 21 of the casing jacket 17 of the filter 15. Additionally a cover 23 of the casing jacket 17 of the filter 15 is furnished in an encircling seat 31 of a driver dog 33.

The thin-walled casing shield 10 of the cylindrical column 3 can have an inspection opening 12 at a level of the water in the reservoir container 9. The thin-walled casing shield 10 can have a shape of a side of a cylinder and can be coiled with sheets of thin sheet metal. Edges 11 of the sheets of the thin-walled casing shield 10 can be inseparably connected.

The edges 11 of the sheets of the thin-walled casing shield 10 can be connected by a welding seam.

The edges 11 of the sheets of the thin-walled casing shield 10 can be connected by an overlap pleat.

The elastic lip 18 of the casing jacket 17 of the filter 15 can be formed at an upper edge of the casing jacket 17.

The casing jacket 17 of the filter 15 can have a side opening 29 located at a top part of a wall 28 of the casing 17 below the side openings 29. The cover 23 of the casing jacket 17 and a half-ring projection 25 can be made on a side surface 24 of said cover 23 and can be seated in a circumferential channel 27 of the casing jacket 17. The encircling seat 31 of the driver dog 33 can be formed as a riser head in a shape of an inverted upside down bottom of a mug forming a middle recess. The charge container 5 can have a controller 43 for controlling the strength of the brew. The controller 43 can contain a dish disk 47 rotatably supported on a bottom of the charge container 5. The dish disk 47 can have an outflow connector seat 52. A pin 56 can be supported by a spring 57, resting on a storage tank 42 for the charge container 5 and seated slidably in the outflow opening 55 furnished in a bottom of said storage tank 42.

The outflow opening 55 can be conical. An angle at a tip of said cone can be larger than an angle of a tip of a conical neck 58 of the pin 56.

A contour of the outflow connector seat 52 can have a shape resembling to a screw line in a circumferential section.

The outflow connector seat 52 can have circumferential slots 53. A length of the circumferential slots can be limited by an outer contour of said outflow connector seat 52.

The controller 43 can be furnished with a hand wheel 44 rotary supported around the bottom 46 of the charge container 5. The hand wheel 44 can be coupled with the dish disk 47. An inner surface 50 of the dish disk 47 can be formed with at least one rib 49 in the form of a triangle protruding from the inner surface 50. The triangle can be seated in a connector seat 74 of a cam follower 48 of the hand wheel 44. The cam follower 48 can be formed in a shape of a circumferential segment of a side of the cylinder. The triangle can have an expansion latch 45 cooperating with a flange collar 70 of the charge container 5.

The pitcher 8 can have an insert 61 seated on an inner surface 65 of a wall of a cover 66 of said pitcher 8 under an inlet opening 67 of the pitcher 8. The inner surface 65 of the wall of the cover 66 can have a sleeve mount 68 as well as a hanger 69. The insert 61 can have an expansion pin 71 rotatably seated in a sleeve opening 68 as well as an expansion holder 73, mounted on the hanger 69 of the cover 66.

The insert 61 can have a slot 62, 262 furnished in a bottom 63 of the insert 61 and in side walls 64. The slot 262 of the insert 61 can be formed at the side walls 64 of the insert 61 and wherein the slot 262 can be located in a vertical position in a lower part of the side wall 64. The slot 62, 262 of the insert 61 can have a form of triangles according to a cross-section. The tips of the triangles can be directed to a middle of the insert 61.

Figure 1:
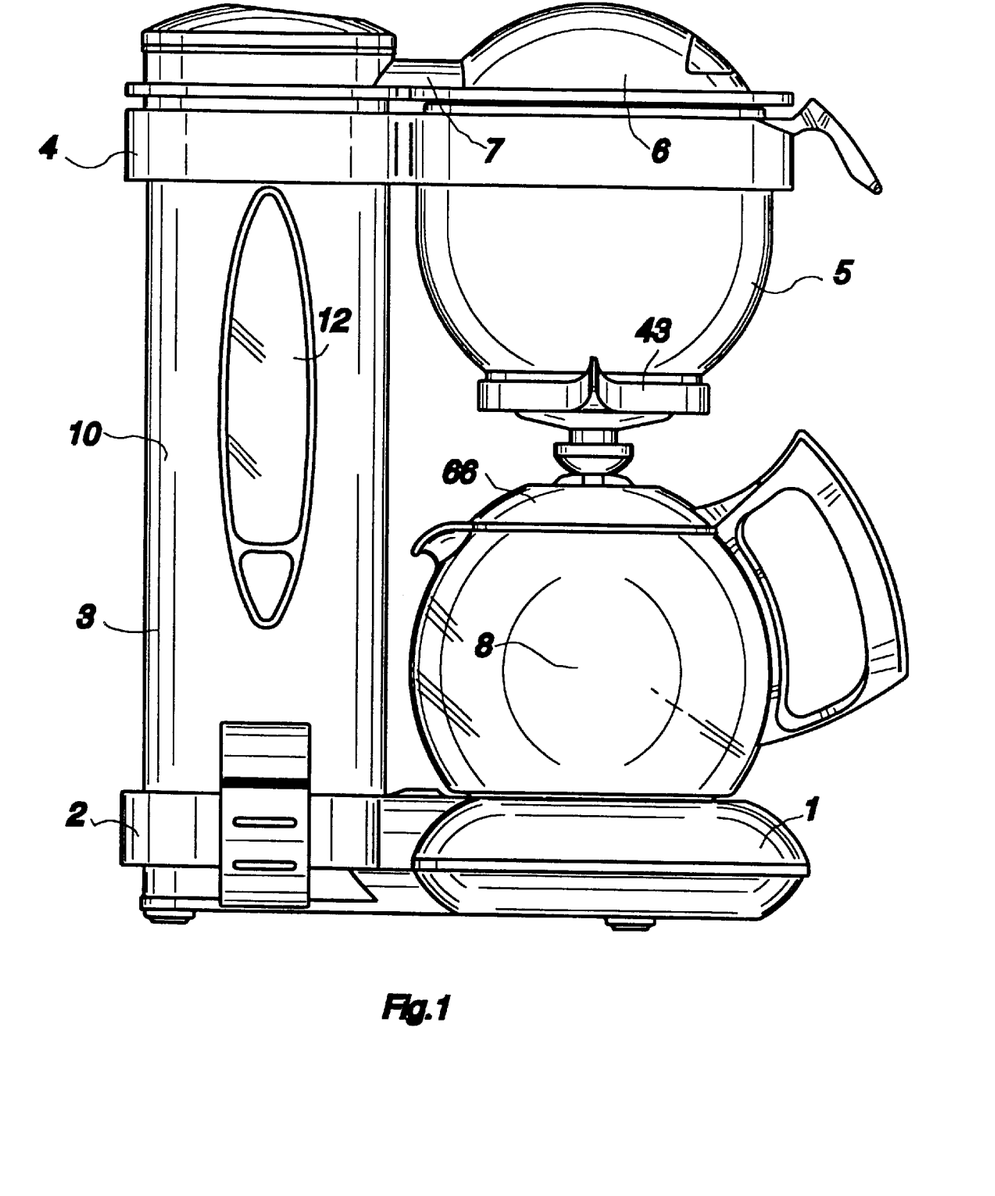
FIG. 1 shows a side elevational view of an automatic beverage maker.

In accordance with the present invention, the automatic beverage maker for brewing coffee, tea or similar beverages is shown in FIG. 1 having a base stand 1, presenting a body resembling the form of a segment of a sphere and next to the base stand there is seated a cylindrical column 3 in an clamping ring 2 being connected to the base stand 1 through a part of the base stand 1. A charge container 5 is mounted to this cylindrical column 3 with the support of an arm 4 of the form of two contacting rings connected to each other, and protected from the top with a cover 6 furnished in the shape of a ball-shaped bowl. The cover 6 is hingedly attached to the cylindrical column 3 with the aid of a hinged arm 7. The inner contour of the hinged arm 7 corresponds to the contour of the arm 4, thereby matching an upper surface of the arm 4. A pitcher 8 for the brewed beverage is placed under the charge container 5 on the base stand 1 of the automatic beverage maker. The charge container 5 and the pitcher 8 are formed each in a shape resembling a ball.

Figure 13:
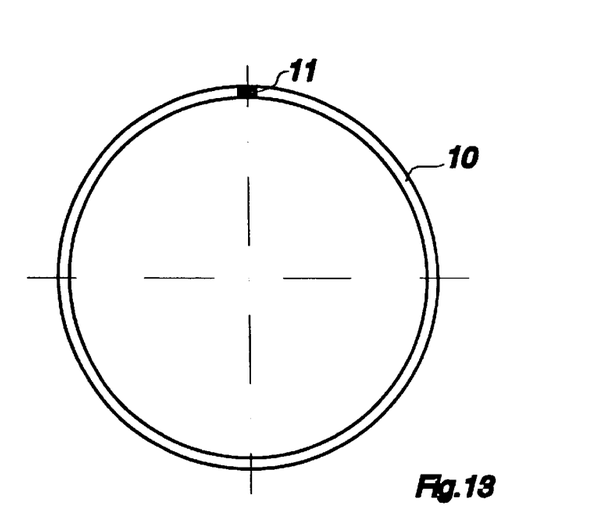
FIG. 13 is a top planar view of the thin-walled casing shield.

The reservoir container 9 (FIG. 2) for the water extends in the upper part of the cylindrical column 3. The cylindrical column 3 is protected by a cylindrical thin-walled casing shield 10 furnished from a sheet of sheet metal. The edges 11 of the casing shield 10 are inseparably connected through welding or overlapping pleats (FIG. 13). The casing shield 10 can protect the cylindrical column 3 in part or over its full height depending on the version of the automatic beverage maker being made. In case of employing a casing shield 10 over the full height of the cylindrical column 3, then the casing shield 10 is furnished with an inspection opening 12 for the water level in the reservoir container 9. A water feed is furnished at the top of the reservoir container 9. A pan 14 is formed in the bottom 13 of the reservoir container 9. A filter 15 is seated inside the pan 14. The upper surface 16 of the filter 15 is located below the bottom 13 of the reservoir container 9 of the water.

Figure 2:
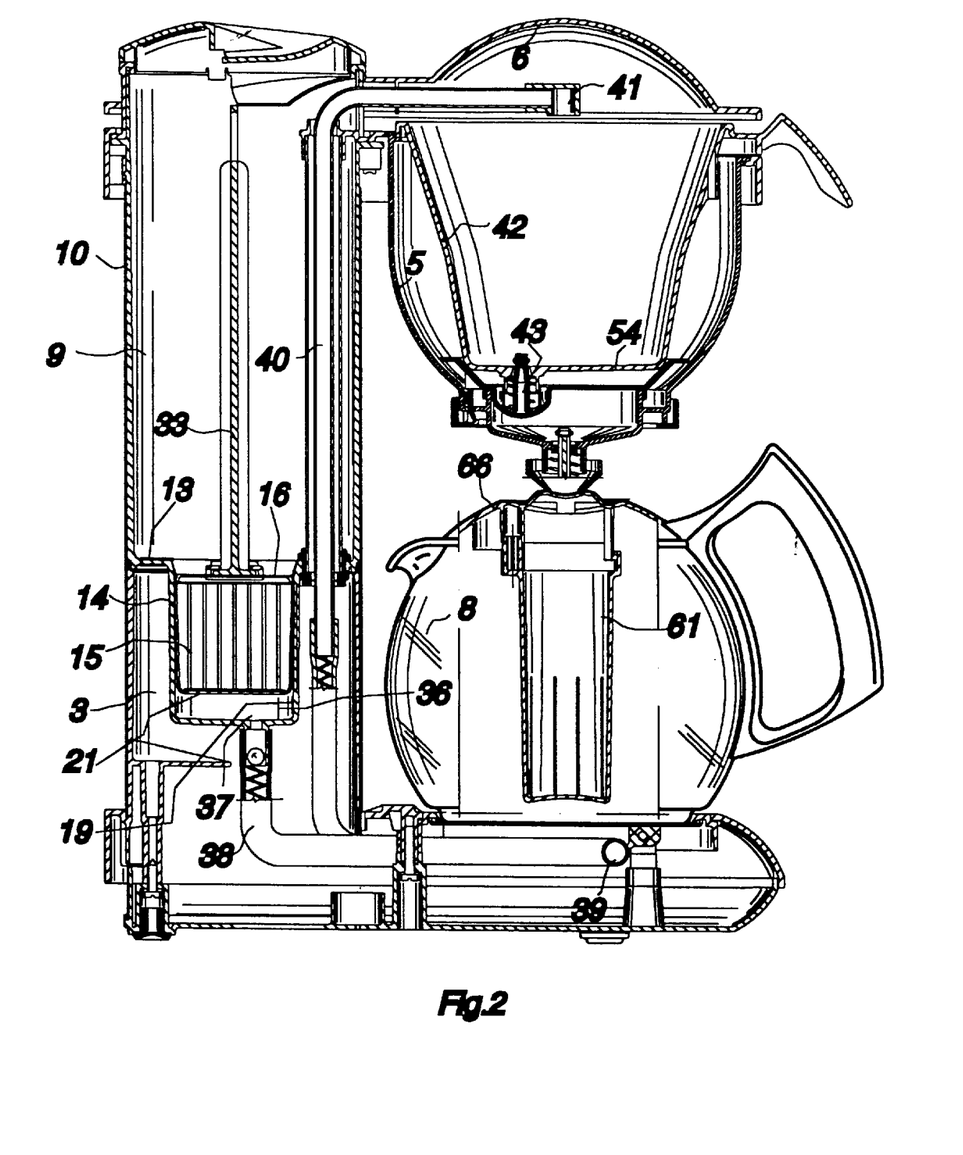
FIG. 2 shows a sectional view of the automatic beverage maker of FIG. 1 through the longitudinal axis.
Figure 3:
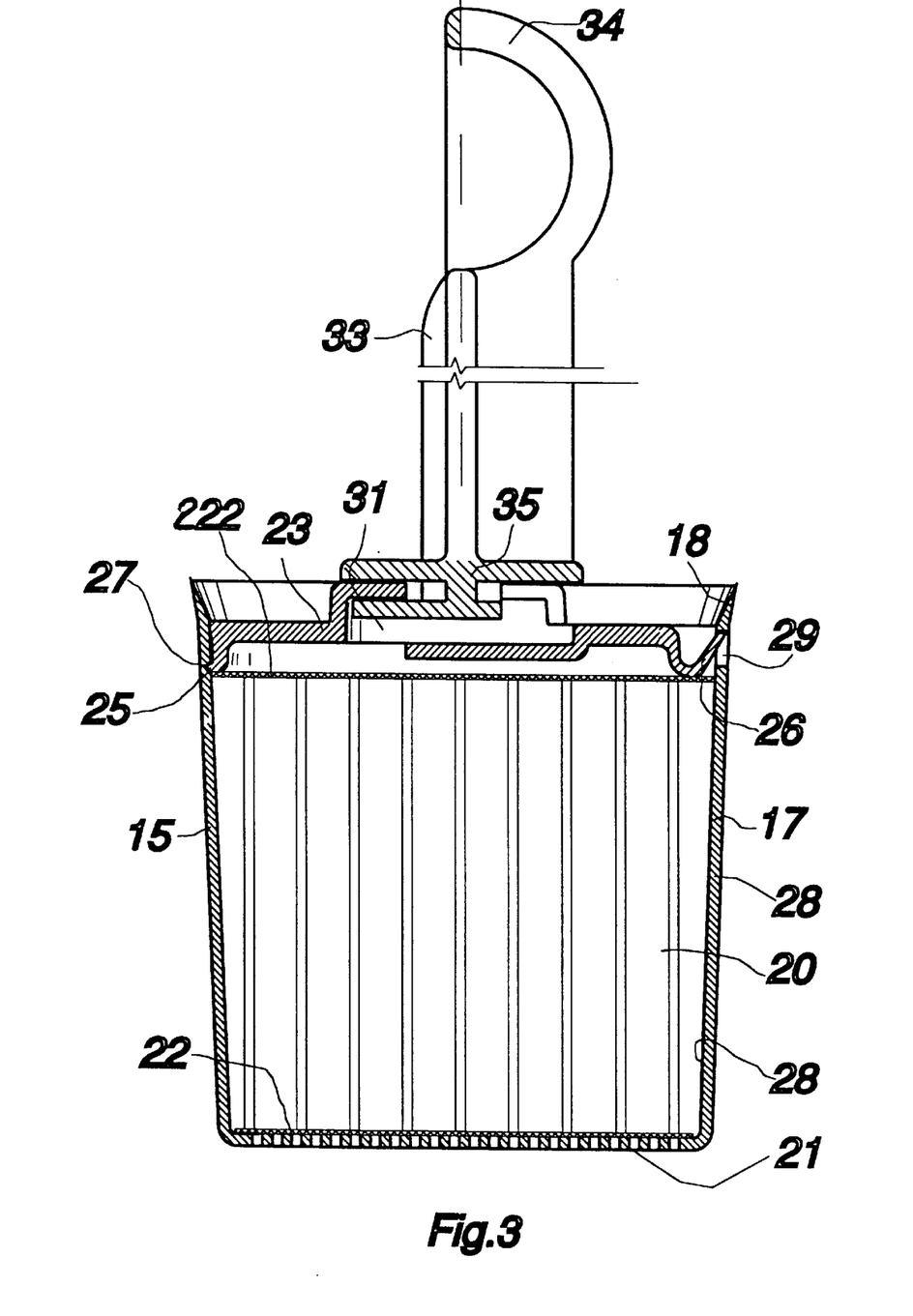
FIG. 3 is a sectional view of the filter with driver dog through an axis along the line designated with letters A—A in FIG. 4.
Figure 4:
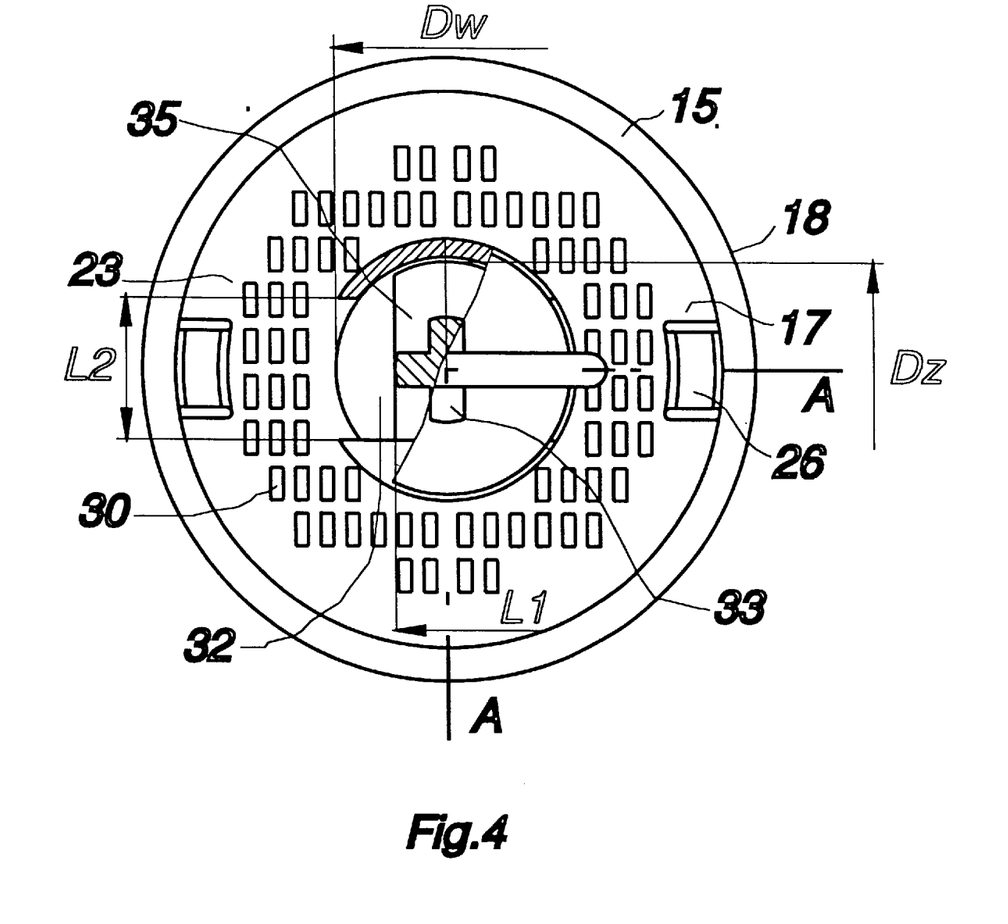
FIG. 4 is a top view of the filter of FIG. 3 with a driver dog.

The filter 15 (FIG. 2) has a casing jacket 17 (FIG. 3) made of artificial materials in the shape of a mug, adapted to the form of the pan 14, with an upper edge bent outwardly and made in the form of an elastic lip 18 supported on the inner side surface 19 of the pan 14 and sealing the pan 14 (FIG. 2). The filter 15 is located in the lower half of the casing shield 10 and the top of the filter 15 is preferably located in the middle third of the vertical length of the casing shield 10. The elastic lip 18 serves to form a seal between the filter 15 and the pan 14 in order to prevent water from the reservoir container 9 to flow between the filter 15 and the pan 14 without being subject to filtration. The casing jacket 17 is preferably of conical shape and becomes wider in an upward direction. The cone angle can be from 2 to 15 degrees and is preferably between 5 and 10 degrees. The height of the body of the filter 15 can be from abut 0.8 to 1.2 times the largest horizontal diameter of the body of the filter 15. The casing jacket 17 contains an exchangeable filtering insert 20 (FIG. 3) containing material in the shape of granules of activated carbon with enhanced activity based on a silver salt. The filtering insert 20 is separated from the perforated bottom 21 of the casing jacket 17 by a bottom separator 22, and the filtering insert 20 is protected from the top by a top separator 222 of similar construction as the bottom separator 22 and made of needled filtering cloth and the cover 23 presses onto the top separator 222. The cover 23 is constructed with a circular half-ring projection 25, protruding to the outside of the side surface 24, and two blocking spring catches 26, formed as leaves bent out in an upward direction of the cover 23. The cover 23 is blocked lockingly inside the casing jacket 17, wherein the projection 25 of the cover 23 is seated in the circumferential channel 27, formed inside the wall 28 of the casing jacket 17, and the spring catches 26 of the cover 23 are blocked in side openings 29 made in the wall 28 of the casing jacket 17 above the circumferential channel 27. The projection 25 is constructed such that water will substantially not flow out of the side openings 29. The cover 23 of the filter 15 is constructed such that it can position-definingly engage with a recess 27 or a protrusion of the casing jacket 17 and that a snap connection between the cover 23 and the casing jacket 17 is provided on an opposite side of the cover 23. The diameter of the filter 15 is provided such that it can easily fit into the pan 14. The outer diameter of the pan 14 is limited by the requirement that both the pan 14 and the top conduit 40 have to fit side by side into the casing shield 10. The wall of the reservoir container 9 and of the casing shield 10 can coincide in an area located above the filter 15. The upper surface of the cover 23 has flow openings 30 (FIG. 4) as well as an encircling seat 31 (FIG. 3) centrally located and made like a riser head in the form of a bottom of a mug positioned upside down with an inner recessed part creating a middle recess 32 (FIG. 4) for pushing into and for the reinforcement in this encircling seat 31 (FIG. 3) of a driver dog 33. The driver dog 33 is made in the form of a bar having a section in the form of a cross and with an ear 34. The driver dog 33 extends to near the top of the reservoir container 9 and allows to easily withdraw the filter 15 from the reservoir container 9 and to exchange an exhausted filter 15 with a fresh filter 15. A leaf spring can be provided engaging the driver dog 33 for holding the filter 15 sealingly in position. The driver dog 33 has in its lower part a flange 35 of a form resembling a rectangular plate, the shortest side of which $L^1$ is fitted to the length $L^2$ of the middle recess 32, but longer than the side Dz of the inner diameter Dw of the encircling seat 31. The bottom 36 of the pan 14 is below the perforated bottom 21 of the casing jacket 17. An intermediate chamber 37 is generated between the bottom 36 of the pan 14 and the perforated bottom 21 of the casing jacket 17. The intermediate chamber 37 is connected with a bottom conduit 38 to the heater 39, from where the heated water is furnished to the charge container 5 through the top conduit 40 ending in a funnel 41 (FIG. 2). The top conduit 40 is led side by side with the pan 14 and is sealingly led through the part of the reservoir container 9 located above the pan 14. The top conduit 40 enters the reservoir container 9 at a level corresponding substantially to the top level of the pan 14. The bottom conduit 38 extends horizontally to an area under the pitcher 8, where the heater 39 is placed. The location of the heater 39 is such as to primarily heat the water rising in the top conduit 40 and such that secondary heat keeps the pitcher 8 and its contents warm. The length of the horizontal section of the bottom conduit 38 can be more than a third of the length of the cylindrical column 3. The length of the horizontal part of the top conduit 40 can be more than a third of the length of the vertical part of the top conduit 40.

Figure 6:
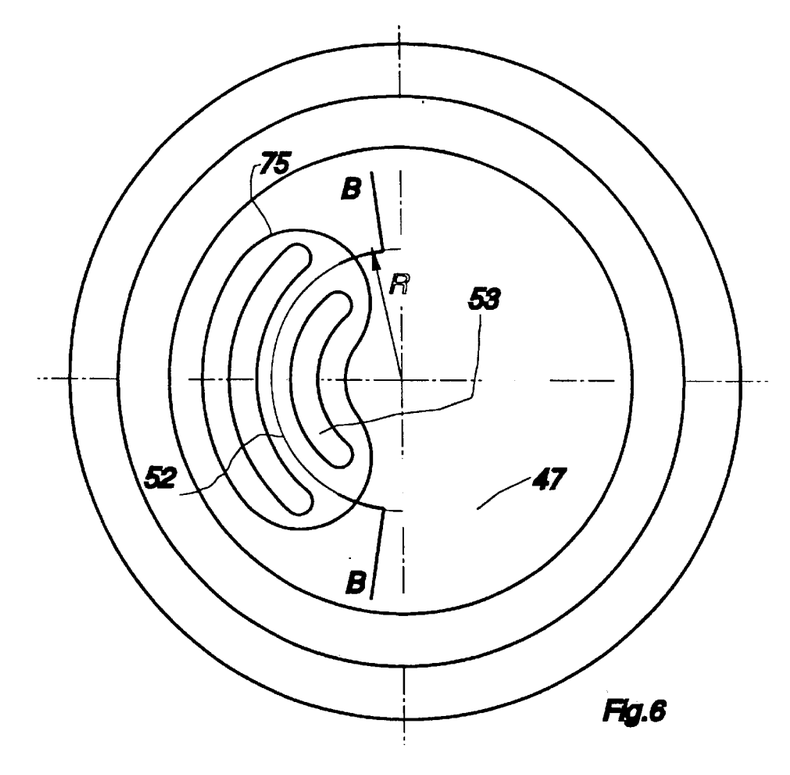
FIG. 6 is a top view of a dish disk of the controller of the strength of the brew.

The charge container 5 contains a storage tank 42 with ground coffee. Liquid in the form of a brewed beverage flows from the storage tank 42 to the pitcher 8 located on the base stand 1 of the automatic beverage maker. The charge container 5 contains a controller 43 (FIG. 2), regulating the strength of the brew and located inside a hand wheel 44. The hand wheel 44 is rotatably supported and located on the outside of the charge container 5 around the bottom 46 of the charge container 5 with the aid of expanding latches 45, which are blocking, engaging and/or locking into a flange collar 70 of the charge container 5. The hand wheel 44 is coupled to a dish disk 47, seated rotatably inside the charge container 5 on the bottom 46 of the charge container 5, with the aid of a cam follower 48 cooperating with a triangular rib 49, protruding from the inner surface 50 of the dish disk 47 and seated in the seat 74 of the cam follower 48. The flat bottom 51 of the dish disk 47 has a circumferentially disposed outflow seat 52, located at a distance R from the rotation axis of the dish disk 47. The dish disk 47, in the area used for controlling flow, has the shape resembling a screw line with circumferential slots 53 formed inside the outflow seat 52. The circumferential length of the circumferential slots 53 is limited by the outer contour 75 of said outflow seat 52 (FIG. 6). The slots 53 extend preferably over an angle of from about 90 to 150 degrees around the axis of the dish disk 47.

Figure 5:
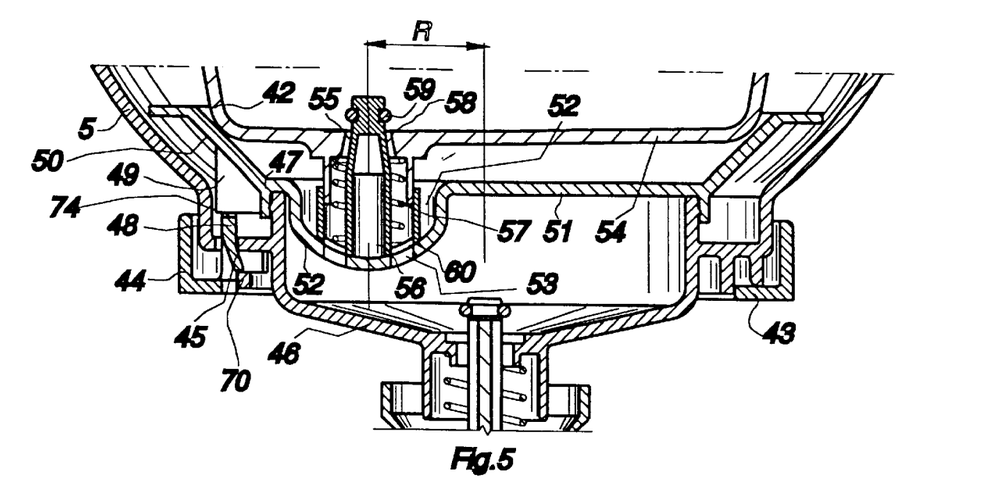
FIG. 5 is a sectional view of a fragment of the charge reservoir container of the automatic beverage maker with a controller for the strength of the brew through a longitudinal axis.
Figure 7:
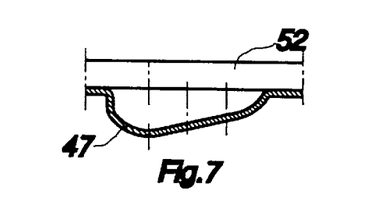
FIG. 7 is a longitudinal sectional view of the seat of the dish disk along section line B—B of FIG. 6.
Figure 8:
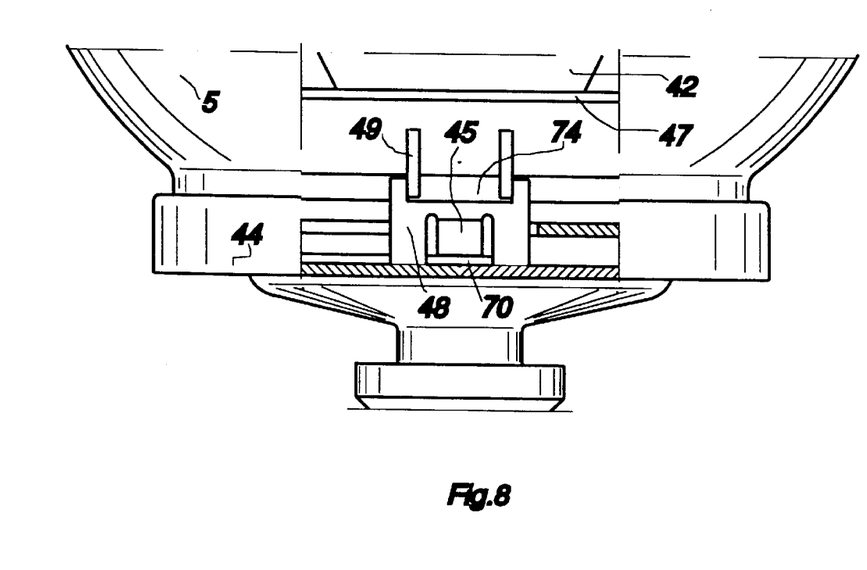
FIG. 8 is a front elevational view of a fragment of the charge reservoir container of the automatic beverage maker with a controller of the strength of the brew with a part section illustrating a coupling of the cam follower with the rib of the dish disk.

A outflow opening 55 is formed in the bottom 54 of the storage tank 42 (FIG. 5) located on the bottom 51 of the dish disk 47 eccentrically at a distance R from the symmetry axis of the storage tank 42. A metering valve in the shape of a pin 56 is seated in the axis of the outflow opening 55. The pin 56 is pressed by a spring 57 against the outflow seat 52 and is ending on its opposite side in a conical neck 58 for closing the outflow opening 55 with a sealing seating head 59. The pin 56 near the sealing seating head 59 and on the opposite side of the sealing seating head 59, which could be provided by an O-ring fitted into a circular groove on the upper end of the pin 56, ends with a spherical surface 60 disposed in the outflow seat 52 and cooperating with the outflow seat 52. The pin 56 is movable in a vertical direction and is pressed downwardly by the spring 57. The bottom of the pin 56 providing a spherical surface 60 rests at the top surface of the outflow connection seat 52. When the hand wheel 44 is turned around its vertical axis, then the outflow seat 52 with edge 75 (FIG. 6) rotates around a center axis and the pin 56 follows the upper contour of the dish disk 47 shown in FIG. 7. The outer contour 75 of the outflow seat 52 in FIG. 7 can be provided such as to provide an optimized control possibility of the outflow speed of the brew from the storage tank 42. The control of the intensity of the flow of the brew from within the storage tank 42 proceeds through establishing the cross-section of the outflow opening 55 with the conical neck 58 of the pin 56 having the effect of a vertical shift of the axially movable pin 56 seated in the curved profiled outflow seat 52 of the dish disk 47 coupled to the rotatable hand wheel 44. The cone angle of the conical neck 58 relative to a vertical axis is preferably less than 10 degrees smaller relative to an opposite cone angle of a conical opening in the bottom of the storage tank 42 and is more preferably less than 5 degrees smaller than an opposite cone angle of a conical opening in the bottom of the storage tank 42.

Figure 9:
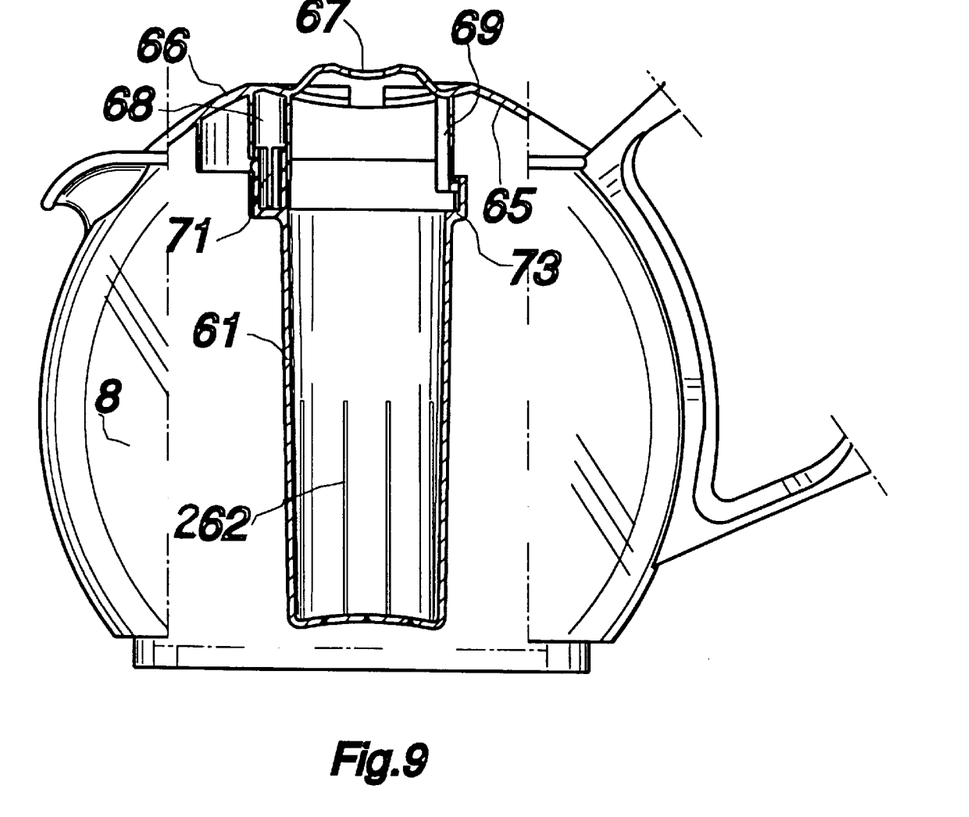
FIG. 9 is a partial sectional view of the pitcher with an insert through a longitudinal axis.
Figure 10:
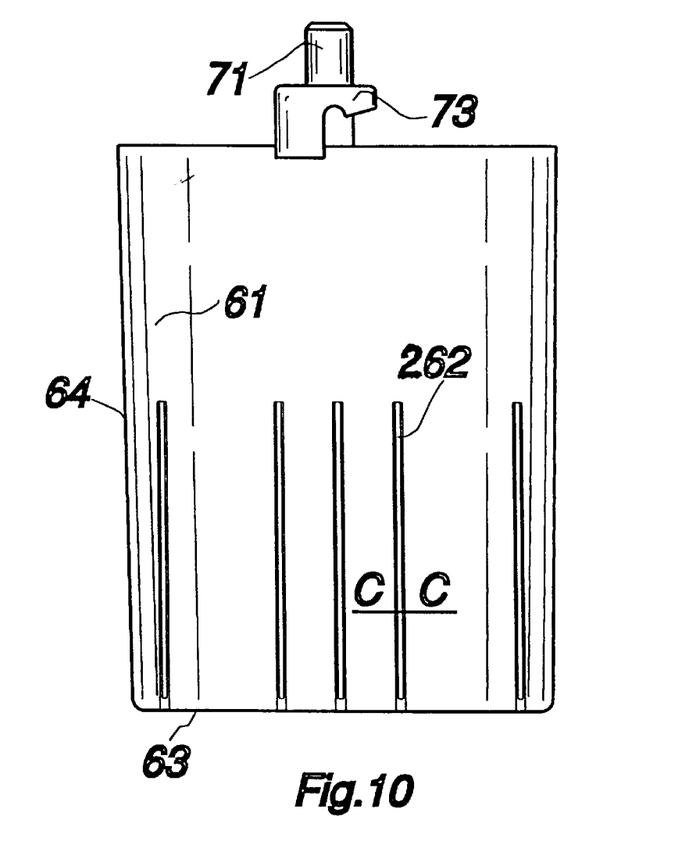
FIG. 10 is a front elevational view of the insert.
Figure 11:
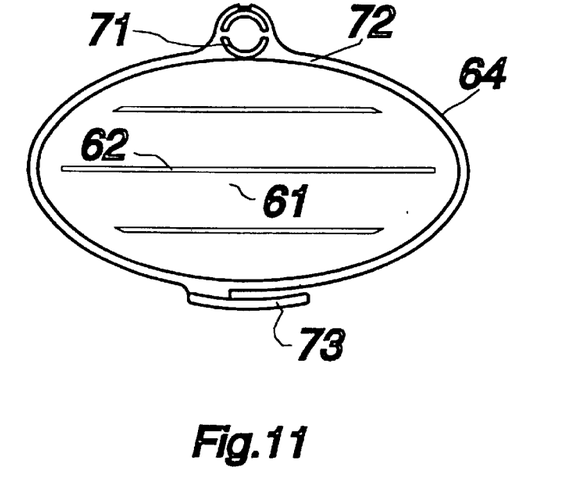
FIG. 11 is a top planar view of the insert of FIG. 10.
Figure 12:
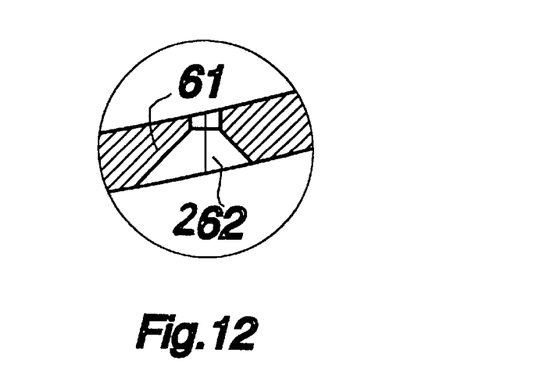
FIG. 12 is a sectional view of the slot of the insert along a line designated with the letters C—C in FIG. 9.

With the goal of expanding the application field of the automatic beverage maker to immersion brewing of herbs or teas, the pitcher 8 of the automatic beverage maker is furnished with a removable insert 61 (FIG. 2). The insert 61 is forced in the amount necessary to the inner surface 65 (FIG. 9) of the wall of the cover 66 of the pitcher 8, or is removed from the pitcher 8 in the case coffee is brewed. The insert 61 (FIG. 2) is made in the shape of a mug with slots 62 (FIG. 10 and 11) located in the bottom 63 of the insert 61 and on the side walls 64. The slots 62 have a cross-sectional form resembling to a triangle, wherein the tips of the triangle are directed to the inside of the insert 61. The insert 61 is hung inside the pitcher 8 on the inner surface 65 of the cover 66 under the inlet opening 67. The inner surface 65 of the wall of the cover 66 is furnished with a sleeve mount 68 (FIG. 9) as well as a hanger 69 (FIG. 9) made in the form of a vertical pin with a side riser head. A pin 71 circular and furnishing snap expansion is seated in the mount 68. The expansion pin 71 is formed on the periphery 72 of this insert 61 for this purpose, but on the opposite side of the expansion pin 71 of the insert 61 there is hung a holder 73 on the hanger 69 of the cover 66.

The volume of the reservoir container 9 can be larger than the volume of the storage tank 42. The volume of the pitcher 8 can be from about 1 to 1.2 times the volume of the reservoir container 9.

It will be understood that each of the elements described above, or two or more together, may also find a useful application in other types of beverage makers differing from the types described above.

While the invention has been illustrated and described as embodied in the context of an automatic hot-beverage maker for coffee, tea, and other beverages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automatic hot-beverage maker for brewing coffee, tea or similar brewed beverages comprising
    a base stand;
    a cylindrical column having a bottom and attached to a bottom of the base stand;
    a thin-walled casing shield protecting the cylindrical column at least over part of a height of the cylindrical column;
    a first clamping ring mounted in an area of the bottom of the cylindrical column to the cylindrical column;
    a pitcher for a brewed beverage placed on the base stand and seated in the first clamping ring;
    an arm mounted to a top of the cylindrical column forming a second clamping ring;
    a charge container mounted to the arm of the cylindrical column and seated in the second clamping ring;
    a reservoir container placed in an upper part of the cylindrical column of the automatic hot-beverage maker;
    a pan adjoining at a bottom of the reservoir container for water;
    an exchangeable filter placed in the pan and having a casing jacket forming an upper elastic lip on an inner side surface of said pan and a cover of the casing jacket furnished in an encircling seat;
    a driver dog extending perpendicular from a top of the encircling seat in an upward direction into the reservoir container;
    an intermediate chamber formed between a bottom of the casing jacket of the filter and a bottom of the pan.

2. The automatic hot-beverage maker according to claim 1, further comprising;
    an inspection window formed in the thin-walled casing shield of the cylindrical column and located at a level of the water surface in the reservoir container;
    wherein the thin-walled casing shield has a shape of a side of a cylinder and is coiled with sheets of thin sheet metal;
    wherein edges of the sheets of the thin-walled casing shield are inseparably connected.

3. The automatic hot-beverage maker according to claim 2, wherein the edges of the sheets of the thin-walled casing shield are connected by a member selected from the group consisting of welding seam and overlap pleat.

4. The automatic hot-beverage maker according to claim 1, wherein the upper elastic lip of the casing jacket of the exchangeable filter is formed at an upper edge of the casing jacket.

5. The automatic hot-beverage maker according to claim 1, further comprising;
    a side opening located at a top part of a wall of the casing jacket;
    a circumferential channel disposed in the top part of the wall of the casing jacket;
    a half-ring projection furnished on the cover and made on a side surface of said cover to be seated in the circumferential channel of the casing jacket;
    a latching projection furnished on the cover and made on the side surface of said cover opposite to the half-ring projection to lockingly engage the side opening.

6. The automatic hot-beverage maker according to claim 1, wherein the encircling seat of the driver dog is formed as a riser head in a shape of an inverted upside-down bottom of a mug forming a middle recess.

7. The automatic hot-beverage maker according to claim 1, further comprising;
    a controller for regulating the strength of the brewed beverage disposed at the charge container;
    wherein the controller contains a dish disk rotatably supported on a bottom of the charge container, wherein the dish disk has an outflow connector seat, wherein a pin is supported by a spring, resting on a storage tank for the charge container and seated slidably in an outflow opening furnished in the bottom of said storage tank.

8. The automatic hot-beverage maker according to claim 7, wherein the outflow opening is conical, and wherein an angle at a tip of said cone is larger than an angle of a tip of a conical neck of the pin; and wherein a contour of the outflow connector seat has a shape resembling a screw line in a circumferential section.

9. The automatic hot-beverage maker according to claim 7, further comprising;

circumferential slots disposed in the outflow connector seat, and wherein a length of the circumferential slots is limited by an outer contour of said outflow connector seat;

a hand wheel furnished at the controller, wherein the hand wheel is rotatably supported around the bottom of the charge container, and wherein the hand wheel is coupled to the dish disk.

10. The automatic hot-beverage maker according to claim 9, wherein an inner surface of the dish disk is formed with at least one rib in a shape of a triangle protruding from the inner surface, wherein the triangle is seated in a connector seat of a cam follower of the hand wheel, wherein the cam follower is formed in a shape of a circumferential segment of a side of a cylinder, and wherein the triangle has an expansion latch cooperating with a flange collar of the charge container.

11. The automatic hot-beverage maker according to claim 1, further comprising;

an insert for the pitcher, wherein the insert is seated on an inner surface of a wall of a pitcher cover of said pitcher under an inlet opening of the pitcher;

wherein the inner surface of the wall of the pitcher cover has a sleeve mount as well as a hanger, wherein the insert has an expansion pin rotatably seated in the sleeve mount as well as an expansion holder, mounted on the hanger of the pitcher cover;

wherein the insert has a first slot furnished in a bottom of the insert;

wherein a second slot is formed at side walls of the insert, and wherein the second slot is located in a vertical position in the lower part of this side wall;

wherein the first slot and the second slot of the insert have a form of triangles according to a cross-section, and wherein tips of the triangles are directed to a middle of the insert.

12. An automatic hot-beverage maker for brewing coffee, tea or similar brews comprising;

a charge container (5) mounted to a cylindrical column (3) of the automatic hot-beverage maker and a pitcher (8) for receiving a brewed beverage placed under this charge container (5) on a base stand (1) of the automatic hot-beverage maker, a reservoir container (9) with a pan (14) for an exchangeable filter (15) placed in an upper part of the cylindrical column (3) of the automatic hot-beverage maker, wherein the pitcher (8), resembling in shape to a segment of a ball, is placed on the base stand (1) of the automatic hot-beverage maker, wherein the cylindrical column (3) has an arm (4), of a form of two rings coupled tangentially to each other, and seated on one side of the base stand (1) in a clamping ring (2) being connected to the base stand (1) and tangentially contacting a part of the base stand (1), wherein the charge container (5) of a form resembling a ball is mounted in the cylindrical column (3), while the pitcher (8) is placed on the base stand (1) of the automatic hot-beverage maker, wherein the cylindrical column (3) is protected at least over part of its height with a thin-walled casing shield (10), wherein the filter (15) is placed in the pan (14) of the reservoir container (9) for water and is mounted with an elastic lip (18) of the casing jacket (17) on an inner side surface (19) of said pan (14) below a bottom (13) of the reservoir container (9) for water, wherein an intermediate chamber (37) is placed between a bottom conduit (38) of the pan (14) and a bottom (21) of the casing jacket (17) of the filter (15), and additionally a cover (23) of the casing jacket (17) of the filter (15) is furnished in an encircling seat (31) of a driver dog (33).

13. The automatic hot-beverage maker according to claim 12, wherein the thin-walled casing shield (10) of the cylindrical column (3) has an inspection opening (12) at a level of the water in the reservoir container (9);

wherein the thin-walled casing shield (10) has a shape of a side of a cylinder and is coiled with sheets of thin sheet metal;

wherein edges (11) of the sheets of the thin-walled casing shield (10) are inseparably connected.

14. The automatic hot-beverage maker according to claim 13, wherein the edges (11) of the sheets of the thin-walled casing shield (10) are connected by a welding seam.

15. The automatic hot-beverage maker according to claim 13, wherein the edges (11) of the sheets of the thin-walled casing shield (10) are connected by an overlap pleat.

16. The automatic hot-beverage maker according to claim 13, wherein the elastic lip (18) of the casing jacket (17) of the filter (15) is formed at an upper edge of the casing jacket (17).

17. The automatic hot-beverage maker according to claim 13, wherein the casing jacket (17) of the filter (15) has a side opening (29) located at a top part of a wall (28) of the casing jacket (17) below the side openings (29), wherein the cover (23) of the casing jacket (17) and a half-ring projection (25) are made on a side surface (24) of said cover (23) and are seated in a circumferential channel (27) of the casing jacket (17);

wherein the encircling seat (31) of the driver dog (33) is formed as a riser head in a shape of an inverted upside down bottom of a mug forming a middle recess;

wherein the charge container (5) has a controller (43) for controlling the strength of the brew;

wherein the controller (43) contains a dish disk (47) rotatably supported on a bottom of the charge container (5), wherein the dish disk (47) has an outflow connector seat (52), wherein a pin (56) is supported by a spring (57), resting on a storage tank (42) for the charge container (5) and seated slidably in the outflow opening (55) furnished in a bottom of said storage tank (42).

18. The automatic hot-beverage maker according to claim 17, wherein the outflow opening (55) is conical, and wherein an angle at a tip of said cone is larger than an angle of a tip of a conical neck (58) of the pin (56).

19. The automatic hot-beverage maker according to claim 17, wherein a contour of the outflow connector seat (52) has a shape resembling to a screw line in a circumferential section.

20. The automatic hot-beverage maker according to claim 17, wherein the outflow connector seat (52) has circumferential slots (53), and wherein a length of the circumferential slots is limited by an outer contour of said outflow connector seat (52).

21. The automatic hot-beverage maker according to claim 17, wherein the controller (43) is furnished with a hand wheel (44) rotary supported around the bottom (46) of the charge container (5), and wherein the hand wheel (44) is coupled with the dish disk (47);

wherein an inner surface (50) of the dish disk (47) is formed with at least one rib (49) in the form of a triangle protruding from the inner surface (50), wherein the triangle is seated in a connector seat (74) of a cam follower (48) of the hand wheel (44), wherein the cam follower (48) is formed in a shape of a circumferential segment of a side of the cylinder, and wherein the triangle has an expansion latch (45) cooperating with a flange collar (70) of the charge container (5).

22. The automatic hot-beverage maker according to claim 13, wherein the pitcher (8) has an insert (61) seated on an inner surface (65) of a wall of a cover (66) of said pitcher (8) under an inlet opening (67) of the pitcher (8);

wherein the inner surface (65) of the wall of the cover (66) has a sleeve mount (68) as well as a hanger (69), wherein the insert (61) has an expansion pin (71) rotatably seated in a sleeve opening (68) as well as an expansion holder (73), mounted on the hanger (69) of the cover (66).

23. The automatic hot-beverage maker according to claim 22, wherein the insert (61) has a slot (62, 262) furnished in a bottom (63) of the insert (61) and in side walls (64);

wherein the slot (262) of the insert (61) is formed at the side walls (64) of the insert (61), and wherein the slot (262) is located in a vertical position in a lower part of the side wall (64);

wherein the slot (62, 262) of the insert (61) has a form of triangles according to a cross-section, wherein tips of the triangles are directed to a middle of the insert (61).

\* \* \* \* \*